March 3, 1953
C. D. ORSINI
2,629,898
EXTRUSION DIES FOR FORMING THERMOPLASTIC
AND THERMOSETTING PLASTIC MATERIALS
Filed Jan. 27, 1951
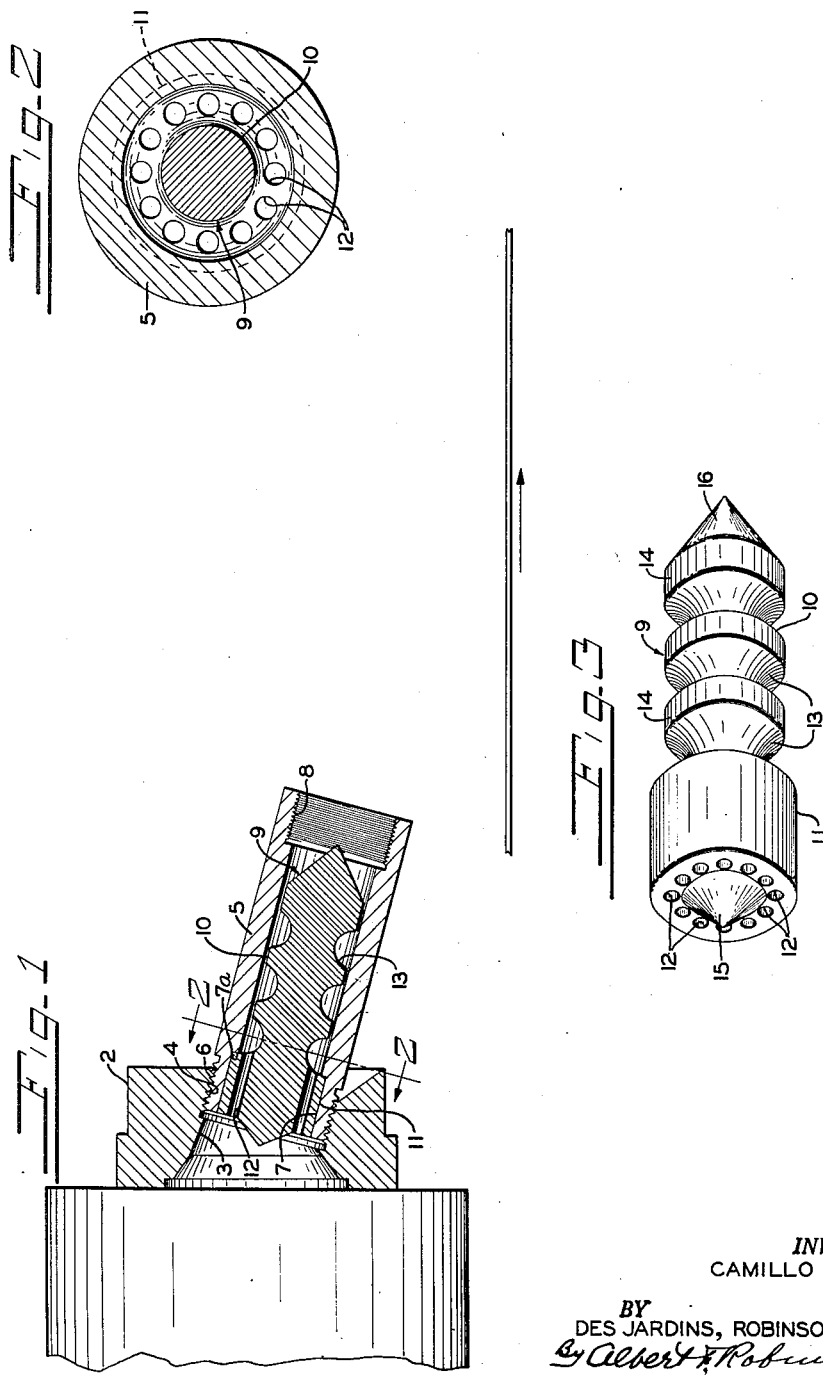
INVENTOR.
CAMILLO D. ORSINI
BY
DES JARDINS, ROBINSON & KEISER
Albert F. Robinson
HIS ATTORNEYS Patented Mar. 3, 1953

2,629,898

UNITED STATES PATENT OFFICE 2,629,898

EXTRUSION DIES FOR FORMING THERMO-PLASTIC AND THERMOSETTING PLASTIC MATERIALS

Camillo Dante Orsini, Highland Park, N. J., assignor to Nixon Nitration Works, Nixon, N. J., a corporation of New Jersey Application January 27, 1951, Serial No. 208,129

9 Claims. (Cl. 18—12)

This invention relates to extrusion dies for forming thermoplastic and thermosetting plastic materials, such as synthetic resins like cellulose acetate, phenol-formaldehyde and the like, and it particularly pertains to the cores mounted within the nozzles of the forming dies that are connected to the discharge end of the extruder device.

It is desired to present the core of the extruded body to the larger surface area than is normally provided by a core of uniform diameter, and to have a filter associated with the means used for mounting the core within the nozzle which is disposed around the core. This formation of the core provides for more effective cooling of the extruded body and also one which is formed with more uniform caliper. Moreover, the core and filter comprise a single unit and are mounted as a unit in the nozzle.

One of the principal objects of my invention is to provide a forming die which is simple in construction and effective in operation.

Another object of the invention is the provision of a forming die which more effectively forms and cools the extruded body.

Another object of the invention is the provision of a forming die comprising a combination core and filter unit mounted in the nozzle.

Another object of the invention is in the provision of a forming die having a core presenting a larger surface area to the extruded body.

Other objects, and objects relating to details of construction and economies of operation, will readily appear from the detailed description to follow. In one instance, I have accomplished the objects of my invention by the device and means set forth in the following specification. My invention is clearly defined and pointed out in the appended claims. A structure, constituting a preferred embodiment of my invention, is illustrated in the accompanying drawings forming a part of this specification, in which:

Fig. 1 is a longitudinal vertical cross sectional view of an adapter and die unit together with a portion of a conventional extruder.

Fig. 2 is a vertical cross sectional view on lines 2—2 of Fig. 1.

Fig. 3 is a perspective view of the core of the die unit.

The die unit comprises a nozzle having one end fitted to an adapter for mounting the said die unit on the discharge end of an extruder. The nozzle has a cylindrical passage therethrough, one end of the passage being enlarged to provide an annular recess for receiving an enlarged head on one end of a core which slidably fits therein and abuts a shoulder or step in the wall of the passage. The shank of the core projecting from its enlarged head or end extends through the passage of the nozzle and is provided on its peripheral wall surface with a series of annular grooves alternating with a series of annular elevations, the crests of the elevations being spaced from the wall of the nozzle passage to permit the plastic mass passing through the die. The enlarged end or head of the core is provided with a series of annular disposed longitudinal perforations therethrough which open on opposite sides of the head to form a filter through which the plastic mass passes in being expressed through the nozzle. The annular grooves on the periphery of the core shank increase the surface area of the core for contacting more of the plastic material passing through the nozzle than if the shank of the core was of a uniform diameter throughout its length. Accordingly, the extruded material is more effectively cooled as it passes through the nozzle and the formed body is of a more uniform caliper. Then, too, the filter is integral with the core to be a part thereof, both being a single unit mounted in the nozzle.

Referring specifically to the drawings in which like numerals designate like parts numeral 2 is an adapter that is attached, as by clamping, to the discharge end of any conventional extruder device. A wall portion of a passage 3 through the adapter is screw threaded at 4 for receiving one end of a tubular nozzle 5 that has screw threads 6 formed on its exterior wall for being screwed to the screw threaded portion 4 of the adapter. The passage through the adapter is inclined downwardly with the screw threaded wall portion 4 so disposed that the nozzle 5 will be downwardly inclined for discharging the extruded body on an endless conveyor disposed to be traversed beneath the nozzle. The end of the passage on the inlet end of the nozzle is of enlarged diameter to provide an annular socket 7, and the opposite end of the passage on the outlet side of the nozzle is of enlarged diameter with its surrounding wall screw threaded at 8 for attaching thereto the end of a sub-nozzle.

A core unit, designated generally by numeral 9, is mounted within the nozzle passage, it being provided with a shank 10 projecting from an enlarged head or end 11 which is of a cross section to snugly fit within the annular socket 7 of the tubular nozzle and abut against the shoulder 7a. The web of the enlarged head or end 11 is provided with a series of longitudinal passages 12, narrowly spaced apart and annularly disposed about the axis of the core. There are preferably about twelve of these passages 12, each being about one-fourth inch in diameter. The peripheral wall of the core shank has a plurality of annular grooves 13 alternately spaced longitudinally with the annular elevations 14, resulting from the annular grooves. The depth of the grooves is about a half inch, and the overall diameter of the core shank through the elevations, is about two inches. While any number of alternating grooves and elevations may be formed, there are preferably about three of each. The crests of the elevations are slightly spaced from the wall of the passage in the tubular nozzle to permit the plastic material being forced through the die between nozzle and the core.

The end of the core on the inlet side of the nozzle is preferably tapered at 15, and its opposite end on the outlet side is preferably tapered at 16.

It will be seen from the foregoing description that I have constructed a compact die unit comprising a minimum of parts with the means mounting the core within the nozzle longitudinally perforated to provide a filter through which the plastic material is forced. The enlarged head of the core slidably fits snugly within the annular socket 7 to be held firmly in place against the step or shoulder 7a in the wall of a passage by the plastic material being expressed through the die unit. Accordingly, the core can be readily removed and replaced within the tubular nozzle, and the core and nozzle are also readily attached to the adapter.

I am aware that there may be various changes in details of construction without departing from the spirit of my invention, and, therefore, I claim my invention broadly as indicated by the appended claims.

Having thus described my invention, what I claim as new and useful and desire to secure by United States Letters Patent, is:

1. An extrusion die unit comprising a tubular casing having an interior wall and a core member mounted therein, said core member having a shank portion with a surrounding wall spaced from the interior wall of the casing and provided with separated alternating annular elevations and depressions disposed about its periphery.

2. An extrusion die nozzle as set forth in claim 1 in which means is formed on one end of the core member for mounting it in the tubular casing.

3. An extrusion die nozzle as set forth in claim 2 in which the mounting means for the core is provided with a filter.

4. An extrusion die nozzle comprising a tubular casing having an inner wall portion of uniform cross section, and a core member mounted in said tubular casing by an enlarged head portion fitting into said casing and provided with shank portion spaced from the interior wall of the casing having separated alternating annular elevations and depressions disposed about its periphery adjacent to the wall portion of the tubular casing which is of uniform cross section.

5. An extrusion die nozzle as set forth in claim 4 in which the inlet end of said nozzle is provided with a filter.

6. An extrusion die nozzle as set forth in claim 5 in which the filter is the means for mounting the core in the tubular casing.

7. An extrusion die nozzle comprising a tubular casing having an inner wall portion of uniform cross section, a socket formed in the inner wall of the casing adjacent its inlet end, a core member having a filter means on one end provided with means fitting in the socket, and a shank portion spaced from the inner wall portion of the casing having separated alternating elevations and depressions disposed about the core adjacent the outlet side of the filter means and that portion of the inner wall of the casing which has a portion of uniform cross section.

8. An extrusion die nozzle as set forth in claim 7 in which the filter means is integral with the core member.

9. An extrusion die unit comprising a tubular casing having one end adapted to be fitted to an extrusion head and its opposite end adapted to receive a sub-nozzle, said end toward the extruder having a socket formed therein, and a core having a shank with a main body portion spaced from the casing and provided with an enlarged head slidably fitting within said socket in the casing to be held in position by the material being extruded, said enlarged head being provided with a plurality of separate longitudinal passages circumferentially disposed and said shank being provided with separated alternating annular elevations and depressions disposed about its periphery.

CAMILLO DANTE ORSINI.

REFERENCES CITED

The following references are of record in the file of this patent:

UNITED STATES PATENTS

| Number | Name | Date |
| --- | --- | --- |
| 1,657,132 | Merle | Jan. 24, 1928 |
| 2,174,779 | Delorme | Oct. 3, 1939 |
| 2,233,987 | Orsini | Mar. 4, 1941 |
| 2,344,959 | Avery | Mar. 28, 1944 |

FOREIGN PATENTS

| Number | Country | Date |
| --- | --- | --- |
| 628,725 | France | July 5, 1927 |